(12) United States Patent
Mason

(10) Patent No.: US 9,052,752 B2
(45) Date of Patent: Jun. 9, 2015

(54) SYSTEM AND METHOD FOR PROVIDING ROLL COMPENSATION

(75) Inventor: Walter M. Mason, San Jose, CA (US)

(73) Assignee: Thomson Licensing, Issy les Moulineaux (FR)

( * ) Notice: Subject to any disclaimer, the term of this patent is extended or adjusted under 35 U.S.C. 154(b) by 994 days.

(21) Appl. No.: 12/680,256

(22) PCT Filed: Jun. 26, 2008

(86) PCT No.: PCT/US2008/008026
§ 371 (c)(1),
(2), (4) Date: Sep. 16, 2010

(87) PCT Pub. No.: WO2009/042002
PCT Pub. Date: Apr. 2, 2009

(65) Prior Publication Data
US 2010/0328212 A1    Dec. 30, 2010

Related U.S. Application Data

(60) Provisional application No. 60/995,382, filed on Sep. 26, 2007.

(51) Int. Cl.
*G06F 3/0346* (2013.01)
*H04M 1/725* (2006.01)

(52) U.S. Cl.
CPC .......... *G06F 3/0346* (2013.01); *H04M 1/72533* (2013.01); *H04M 2250/12* (2013.01)

(58) Field of Classification Search
CPC .................................................. H04M 1/72533
USPC ............................................................. 702/93
See application file for complete search history.

(56) References Cited

U.S. PATENT DOCUMENTS

| | | | |
|---|---|---|---|
| 2005/0242947 A1* | 11/2005 | Burneske et al. | 340/539.13 |
| 2005/0253806 A1 | 11/2005 | Liberty et al. | |
| 2006/0164393 A1 | 7/2006 | Wu | |
| 2008/0158154 A1* | 7/2008 | Liberty et al. | 345/158 |

FOREIGN PATENT DOCUMENTS

| | | |
|---|---|---|
| JP | 09005352 | 1/1997 |
| JP | 2004-150900 | 5/2004 |
| WO | WO 95/19031 A | 7/1995 |
| WO | WO 2007/105133 A | 9/2007 |

OTHER PUBLICATIONS

Search Report dtd Oct. 9, 2008.

* cited by examiner

*Primary Examiner* — Manuel L Barbee
(74) *Attorney, Agent, or Firm* — Robert D. Shedd; Vincent E. Duffy; Michael A. Pugel

(57) ABSTRACT

The embodiments of the present disclosure are directed towards a method and apparatus for providing roll compensation in a control device, the method and apparatus including acquiring rotational data and linear data indicative of movement of the control device, applying roll compensation to the acquired data, and removing a roll compensation error from the roll compensated data. Inertial sensors such as gyroscope sensors and accelerometer sensor(s) may be used to acquire the rotational and linear data.

53 Claims, 3 Drawing Sheets

SYSTEM AND METHOD FOR PROVIDING ROLL COMPENSATION

This application claims the benefit under 35 U.S.C. §365 of International Application a PCT/US2008/008026, filed Jun. 26, 2008, which was published in accordance with PCT article 21(2) on Apr. 2, 2009, in English and which claims the benefit under 35 U.S.C. §119 of a provisional application 60/995,382 filed in the United States on Sep. 26, 2007.

FIELD OF THE INVENTION

The present invention relates generally handheld control devices and more specifically to handheld control devices having roll to compensation and improved usability associated therewith.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional control devices control receivers such as televisions, computers, and displays. Typical control functions include powering the receivers on and off, navigating through menus displayed by the receivers, and controlling the display of a graphical element displayed by the receiver. Usually a user accesses these control functions using buttons on the control device (e.g., power button, navigational buttons, menu buttons, etc.) or the control device can detect simple movement (e.g., a mouse using a track ball or LED arrangement to detect motion along a surface). These conventional control devices suffer from the drawback of not tracking their own movement in free space (i.e., conventional control devices can only track their movement along a surface).

Recently newer control devices have been introduced. These newer devices can track their motion in free space using inertial sensors such as accelerometer sensors or gyroscope sensors. However, these newer control devices suffer from the drawback of not providing roll compensation. As a result, the free space tracking of the newer control devices is not precise.

The present disclosure is directed towards overcoming these drawbacks.

SUMMARY OF THE INVENTION

The disclosed embodiments of the present invention are directed towards a method and apparatus for providing roll compensation in a control device, the method and apparatus including acquiring rotational data and linear data indicative of movement of the control device, applying a roll compensation to the acquired data, and removing a roll compensation error from the roll compensated data. Inertial sensors such as gyroscope sensors and accelerometer sensor(s) may be used to acquire the rotational and linear data.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system for controlling a display using a control device having inertial sensors such as accelerometers and gyroscopes. Other systems utilized to control devices other than a display may include very similar structures. Those of ordinary skill in the art will appreciate that the embodiment of the system and circuits described herein is merely one potential embodiment. As such, in alternate embodiments, the components of the system and circuits may be rearranged or omitted, or additional components may be added.

Figure 1:
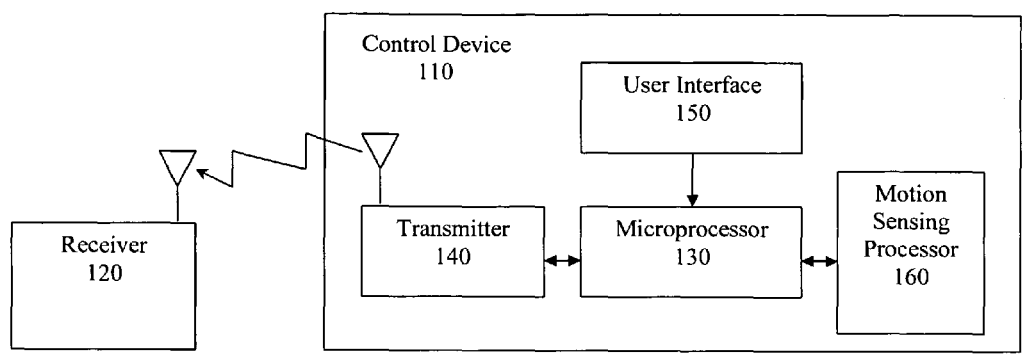
FIG. 1 is a block diagram of an exemplary control system using an embodiment of the present disclosure.

Turning now to the drawings and referring initially to FIG. 1, a block diagram of an exemplary system using an embodiment of the present disclosure is shown. FIG. 1 illustrates a potential application, environment, or system 100 wherein the roll compensation process of the present disclosure can be utilized. System 100 includes a control device 110 and a receiver 120. Control device 110 may be, but is not limited to, a remote control, a mouse, a game controller, a virtual reality controller, a pointer, a mobile device (e.g., a lap top computer, PDA, cell phone, wireless phone, mobile TV or the like), or other digital media input devices. Control device 110 detects, as discussed below, when it is moved (i.e., when it is moved in a linear fashion along the x, y or z plane, when it is rotated (e.g., pitch, yaw and roll movement), or any combination thereof) and in response to the detection of movement control device 110 transmits control signals to receiver 120. Receiver 120 may be, but is not limited to, a TV, a display, a set top box, a game console, virtual reality console or the like. Furthermore, it should be noted that the receiver 120 and control device 110 may be integrated onto the same platform (e.g., a hand-held game console, PDA, cell phone, wireless phone, mobile TV or the like) such that the control signals are generated by the control device when the platform is moved. In response to the receiver 120 receiving the control signals from control device 110, the receiver 120 may cause a graphical element such as, but not limited to, a cursor, highlight box, menu, game character or object, or the like to be moved on a display. The precision of the movement of the graphical element may be improved by the roll compensation process of the present disclosure as described in further detail below. It should also be noted that the receiver may be integrated in a moveable device (e.g., a remote control car, plane, boat, electro-mechanical device or the like) such that the movement of the control device 110 results in movement of the moveable device.

Control device 110 includes a microprocessor 130, a transmitter 140, a user interface 150 and a motion sensor processor 160 that utilizes the roll compensation process of the present disclosure. In one embodiment, microprocessor receives inputs from user interface 150 and motion sensing processor 160 and based on the inputs causes transmitter 140 to transmit control signals to receiver 120. In an alternative embodiment, e.g., when the receiver 120 and control device 110 are integrated onto the same platform, microprocessor 130 may directly control the movement of the graphical element on a display or may indirectly control such movement via the receiver 120, other intermediate modules or circuits, or any combination thereof. The user interface 150 may include, but is not limited to, user selectable buttons, switches, dials, scroll or mouse wheels, touch sensitive screens, or the like. Some exemplary functions controlled or initiated by the user interface 150 may include, but is not limited to, powering the control device on and off, selecting a highlighted object on a display, adjusting the activity of the motion sensing processor 160 (e.g., having the motion sensor processor 160 enter into a first mode if the control device 110 is on a surface and having the motion sensor processor 160 enter into a to second mode if the control device 100 is removed from the surface and moved in free space), causing a menu to displayed on a display, or other functions known by those skilled in the art. The motion sensor processor 160 acquires motion data or information from various motion sensors, as discussed below, and combines or integrates the motion data to generate a motion signal representative of the movement of the control device 110. The motion sensor processor 160 passes the motion signal to microprocessor 130 such that microprocessor 130 can, for example, cause a graphical object to be moved on a display.

In a preferred embodiment, control device 110 includes the following features. Control device 110 has five degrees of freedom (e.g., motion is tracked along two rotational axes by inertial sensors such as gyroscope sensors and along three linear axes by inertial sensors such as accelerometers). Control device 110 has 360 degrees of roll compensation such that any rolled orientation produces true X-Y motion. Control device 110 has dynamic drift compensation such that, e.g., accelerometer(s) facilitates or allows drift compensation during the motion of the control device 110. Control device 110 has a small size, low power consumption a fast start-up time. Some exemplary operating parameters of control device 110 include having a supply voltage from 2.7 to 3.3 Volts DC (VDC), having a Serial Peripheral Interface (SPI) between microprocessor 130 and motion sensing processor 130, having a detect movement current of 7 microamps, a steady state current of 4.5 milliamps, and a maximum sampling rate of 8 milliseconds.

Figure 2:
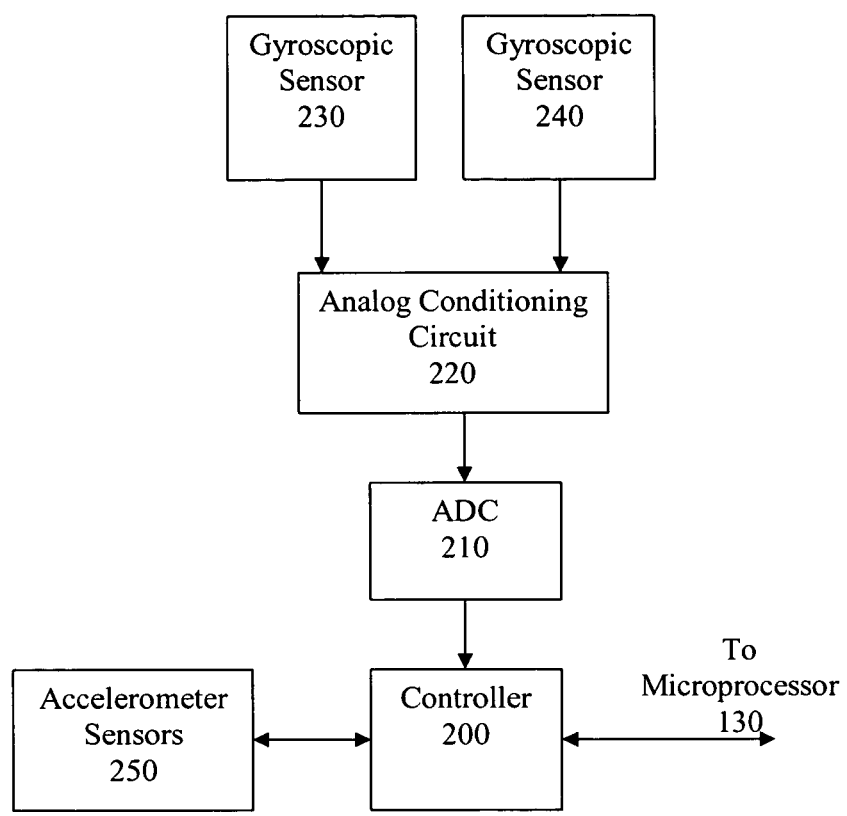
FIG. 2 is a diagram further illustrating the motion sensing processor of FIG. 1.

Referring now to FIG. 2, the motion sensing processor 160 of FIG. 1 is illustrated in greater detail. Motion sensor processor 160 includes a controller 200 that receives rotational or angular motion signals from inertial sensors such as gyroscopic sensors 230 and 240 via analog conditioning circuitry 220 and an analog to digital converter (ADC) 210. Analog conditioning circuitry 220 filters the analog rotational motion signals received from gyroscopic sensors 230 and 240 such that the filtered analog rotational motion signals are in the proper condition to be digitized by ADC 210. A variety of filters and filtering techniques for conditioning analog signals are known by those skilled in the art and considered within the scope of the present disclosure. ADC 210 digitizes the rotational motion signals and provides the digital rotational motion signals to controller 200. ADC 210 preferably has a 10-bit, 2 channel ADC resolution although other ADC resolutions are considered within the scope of the present disclosure.

Controller 200 also receives linear motion signals form inertial sensors such as accelerometer sensors 250. In one exemplary embodiment, three accelerometers 250 provide signals to controller 200. The first accelerometer for detecting motion along the X axis and providing a signal to controller 200 indicative of the motion along the X axis, the second accelerometer for detecting motion along the Y axis and providing a signal to controller 200 indicative of the motion along the Y axis, and the third accelerometer for detecting motion along the Z axis and providing a signal to controller 200 indicative of the motion along the Z axis. It should be noted that analog or digital signals or data may be provided by accelerometer sensors 250 and the processing of either by controller 200 is considered within the scope of the present disclosure. In an alternative embodiment, a Micro Electro-Mechanical System (MEMS) device such as a three-axis acceleration sensor may be used for detecting linear motion of the control device along the X, Y and Z axes.

Controller 200 preferably contains a software module in, e.g., firmware that includes the process for providing roll compensation in accordance with the present disclosure as discussed in further detail below. It should be noted that the software module, in alternative embodiments may be stored in internal memory of the controller 200 or in an external memory (not shown). The roll compensation process involves performing roll compensation directly on received rotational rate data without translating a frame of reference and further involves removing the undesirable effects of the roll compensation without calculating the centrifugal and linear acceleration of the control device 110.

Controller 200 may fabricated as an integrated circuit having the following operating parameters: operating within a supply voltage range from 2.7 to 5.5 VDC, operating within a temperature range from −10 degrees Celsius to +70 degrees Celsius, having a typical current consumption of 1.7 milliamps at 3.3 VDC and 25 degrees Celsius, and having a sleep current consumption of 10 microamps. Preferably, controller 200 allows for the dynamic adjustment of some parameters such as, but not limited to, Gain, thresholds and power state control.

It should be noted that although ADC 210, analog conditioning circuit 22, gyroscopic sensors 230 and 240, and accelerometer sensors 250 are illustrated as being separate from controller 200 any or all of these elements may be an integral part of controller 200. Creating or fabricating such an integrated controller is known by those skilled in the art and considered within the scope of the present disclosure.

Figure 3:
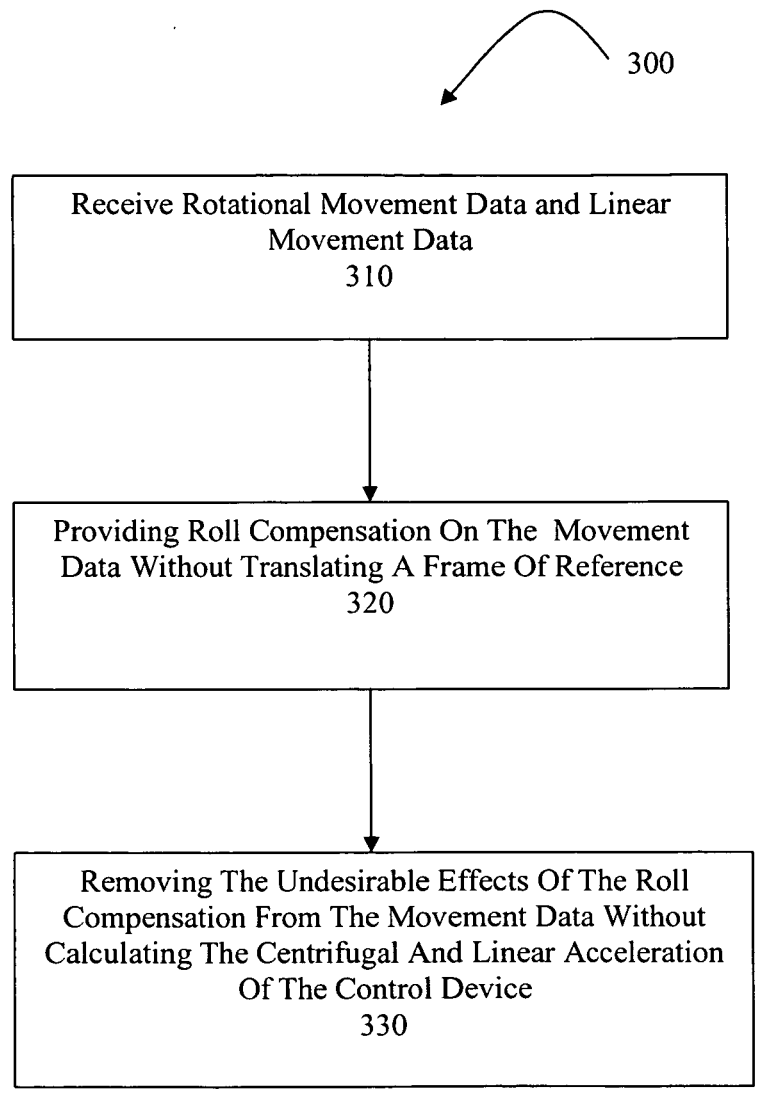
FIG. 3 is a block diagram illustrating an exemplary roll compensation process of the present disclosure.

Controller 200 receives the linear and rotational motion signals generated by the gyroscopic sensors 230 and 240 and accelerometer sensors 250, processes the motion signals to, inter alia, provide roll compensation in accordance with the present disclosure, and passes the processed motion signals to the microprocessor 130 of control device 110. It should be noted that controller 200 may pass each of the processed rotational motion signals and linear motion signals separately to the microprocessor 130, may pass an integrated signal representative of the processed rotational motion signals and linear motion signals to the microprocessor 130, or may only selectively pass some of the processed rotational motion signals and linear motion signals to the microprocessor 130 depending on, e.g., what operating mode the control device is operating under. For example, if the control device 110 is operating as desk top mouse, the controller 200 may only pass signals indicative of the control device's linear movements in the X and Y directions. Alternatively, if the control device 110 is operating in free space, the controller may pass separated signals or an integrated signal indicative of all of the control devices linear and rotational movements. Referring now to FIG. 3, a method or process 300 for providing roll compensation in accordance with the present disclosure is shown. Initially, at step 310, controller 200 receives or acquires rotational movement data or signals from the gyroscopic sensors 230 and 240 and linear movement data or signals from the accelerometers 250, as described above. Next, at step 320, controller 200 provides or applies roll compensation on the movement data without translating a frame of reference. The roll compensation step 320 is further discussed in the software module description provided below. Afterwards, at step 330, the controller 200 removes the undesirable effects of the application of the roll compensation, or roll compensation error, from the movement data without calculating the centrifugal and linear acceleration of the control device 110 as further discussed in the software module description provided below The method for providing roll compensation in accordance with the present disclosure is discussed in the software module provided below. The software module is part of firmware utilized by the controller 200.

Software module implementing roll compensation feature in the controller 200:

/*******************************************************************/
                Inclusion of External Declaration Files
/*******************************************************************/ include "project_config.h"
include <stdio.h>
include <stdlib.h>
include "spi.h"

//------------------------------------
// External Function Declarations
//------------------------------------
void Trap (unsigned char);

//------------------------------------
// Local Function Declarations
//------------------------------------
double Dabs(double x);
double Swine(double x);
double Root(double r);
double Get_Theta( double x, double y);
void Gyro_Off (void);

//------------------------------------
// Local Definitions
//------------------------------------
define PI   3.141592654
define PIBY2 1.5707963
define COEFF_1  0.7854
define COEFF_2  2.3562
define COEFF_3  1.27323954474
define COEFF_4 -0.4052847346
define COEFF_5  0.225
define READ_X      0x93
define READ_Y 0xB3 define ACTIVATE_INTERVAL      5
define DESK_SENSE_INTERVAL 100
define DESK_SENSE_PULSE    500

```
    z = (float)number;
x = z * 0.5F;
y = z;
i = * ( long * ) &y;
i = 0x5f3759df - ( i >> 1 );
y = * ( float * ) &i;
//y = y * ( f - ( x * y * y ) );
//y = y * ( f - ( x * y * y ) );
return (double)(z*y);
}
```

```
#define ADC_INTERVAL          6
#define GYRO_TIMER_INTERVAL 100
#define GYRO_SCALE_FACTOR  50
#define STEADY_THRESHOLD   20
#define MOTION_NOISE       0  //wmm 10 > 0 for testing
#define STEADY_SAMPLES     10
//#define CT                 374//wmm 374 is theoretical center
//#define SPAN               8
#define GUL                406 //wmm  G Vector Magnitude qualifier Upper Limit +16VG
#define GLL                342 //wmm  G Vector Magnitude qualifier Lower Limit +16VG
// CT = 374. 374 +/- 64 = 438,310
// CT = 374. 374 +/- 32 = 406,342 proto values
// CT = 374. 374 +/- 16 = 390,358
// CT = 374. 374 +/- 8 = 382,366 = RC too small
#define GVECTOR_ZERO       3.0 //wmm 10*sqrt(Gain_AX)= ~ 15 deg.
/***********************************************************************
*          Variable Storage
***********************************************************************/
//extern unsigned char self_steady_done_flag;
unsigned int rest_count_x, rest_count_y;
extern unsigned char Buf[];
signed int gyro_x, gyro_y;
signed int x_min, y_min, x_max, y_max;
signed int ax_min, ay_min, az_min, ax_max, ay_max, az_max;
signed long x_steady, y_steady;
unsigned char num_steady_samples;
signed int x_mickeys, y_mickeys;
unsigned long gyro_timer;
unsigned char turned_on;
signed int    accel_x, accel_y, accel_z, gain_sum, sign;
signed int    x_sum, y_sum, z_sum;
double        dax, day, daz;
double        theta2, theta3, theta4;
double        rrx, rry, rr_mag, gvisya;
double        grv_axyz_mag;
double        extra_yaw, extra_pitch;
```

```
extern unsigned char   gyro_state;
//---------------------------------------------------------------
// Gyro Support Routines
//---------------------------------------------------------------
//---------------------------------------------------------------
// Gyro_Init
//---------------------------------------------------------------
void Gyro_Init(void)
{
    ADC12CTL1 = (AdcClkDiv << 5) | (AdcClkSel << 3) | (CONSEQ0);
    ADC12MCTL0 = 0x70;// 0x7x uses AVex as the reference so we are quiter and temp stability is increased.
    ADC12MCTL1 = 0x71 | EOS;
    theta3 = 0;//wmm
//   grv_axyz_mag_ref = 68;
}
//---------------------------------------------------------------
// Read_XYZ
//---------------------------------------------------------------
void Read_XYZ(void)
{
    accel_x = spi_xyz_get (OUT_X_L);
    accel_x |= (spi_xyz_get (OUT_X_H)) << 8;
    accel_y = spi_xyz_get (OUT_Y_L);
    accel_y |= (spi_xyz_get (OUT_Y_H)) << 8;
    accel_z = spi_xyz_get (OUT_Z_L);
    accel_z |= (spi_xyz_get (OUT_Z_H)) << 8;
    P2OUT ^= 1;
}
//---------------------------------------------------------------
// Read_ADC
//---------------------------------------------------------------
void Read_ADC(void)
{
    gyro_x = 0xfff - ADC12MEM0;
    gyro_y = 0xfff - ADC12MEM1;
    ADC12CTL0 &= ~(ENC | ADC12SC); // Set the X enable and start conversion sequence
    asm ("dint");
```

```
    Read_XYZ();
    asm ("eint");
}
//--------------------------------------------------------------
// Start_ADC
//--------------------------------------------------------------
void Start_ADC(void)
{
    if (gyro_timer)
    {
        ADC12CTL0 |= ENC | ADC12SC;         // Set the X enable and start conversion sequence
        QueDelay (Read_ADC, 1);             // Queue task to read the results
    }
} void ClearWarmup (void)
{
    if (STEADY_FLAG_TRUE)
    {
        SelfSteadyCounter--;
        if (!SelfSteadyCounter)
        {
            CLR_STEADY_FLAG;
            if (ProgramMode)
                lcd_print (LEFT, 6, 1, "Self Steady failed", 0, 0);
            Gyro_Off();
        }
    }
    CLR_WARMUP_FLAG;
}
//--------------------------------------------------------------
// Gyro_On
//--------------------------------------------------------------
void Gyro_On(void)
{
    if (!gyro_timer)
    {
```

```
        P6DIR &= ~3;
        P6OUT &= ~0x80;        // Apply power to gyros and A/D
        ADC12CTL0 = ADC12ON | (AdcRef << 6) | REFON | (SampleTime << 8) | (AdcMulti << 7);
        P6SEL |= 3;                                    // Set the port mode select bits
        spi_xyz_put (CTRL1, POWUP | DEC0 | XENA | YENA | ZENA);
        spi_xyz_put (CTRL2, MAX6G | BDU);
        SampleDivider = 17;
        SET_WARMUP_FLAG;
        SET_SAMPLE_FLAG;
        QueDelay (ClearWarmup, 250);
        gyro_timer = GYRO_RUN_TIME;
    }
}

//-------------------------------------------------------------------
// Gyro_Off
//-------------------------------------------------------------------
void Gyro_Off(void)
{
    CLR_SAMPLE_FLAG;
    spi_xyz_put (CTRL1, 0);
    ADC12CTL0 = 0;
    P6SEL &= ~3;                    // Deactivate the A/D input pins
    P6OUT |= 0x80;                  // Remove power from gyros and A/D
    gyro_timer = 0;
}

//-------------------------------------------------------------------
// Calc_Mickeys
//-------------------------------------------------------------------
void Calc_Mickeys(void)
{
    x_mickeys = ((gyro_x - x_offset));
    y_mickeys = ((gyro_y - y_offset));

if( (x_mickeys < G_MotionNoise)&&(x_mickeys > -G_MotionNoise) &&\
        (y_mickeys < G_MotionNoise)&&(y_mickeys > -G_MotionNoise) )
```

```
        x_mickeys = y_mickeys = 0;

if(x_mickeys > (MaxMickeys * Gain_X))//wmm can't find where we limit to maxmickeys so I added...
        x_mickeys = MaxMickeys * Gain_X;
    if(x_mickeys < (-MaxMickeys * Gain_X))
        x_mickeys = -MaxMickeys * Gain_X;
    if(y_mickeys > (MaxMickeys * Gain_Y))
        y_mickeys = MaxMickeys * Gain_Y;
    if(y_mickeys < (-MaxMickeys * Gain_Y))
        y_mickeys = -MaxMickeys * Gain_Y;

}

//-----------------------------------------------------------------
// Reset_Self_Steady
//-----------------------------------------------------------------
void Reset_Self_Steady(void)
{
    x_min = gyro_x;
    y_min = gyro_y;
    x_max = gyro_x;
    y_max = gyro_y;
    ax_min = accel_x;
    ax_max = accel_x;
    ay_min = accel_y;
    ay_max = accel_y;
    az_min = accel_z;
    az_max = accel_z;
    x_sum = accel_x;
    y_sum = accel_y;
    z_sum = accel_z;
    x_steady = gyro_x;
    y_steady = gyro_y;
    num_steady_samples = STEADY_SAMPLES - 1;
}

//-----------------------------------------------------------------
// Self_Steady
```

```
//------------------------------------------------------------
void Self_Steady(void)
{
    x_steady += gyro_x;
    y_steady += gyro_y;
    x_sum += accel_x;
    y_sum += accel_y;
    z_sum += accel_z;
    if (gyro_x > x_max)         /* Adjust max & min values */
            x_max = gyro_x;
    if (gyro_x < x_min)
            x_min = gyro_x;
    if (gyro_y > y_max)
            y_max = gyro_y;
    if (gyro_y < y_min)
            y_min = gyro_y;
    if (((ax_max - ax_min) > A_SteadyThreshold) ||
                ((ay_max - ay_min) > A_SteadyThreshold) ||
                ((az_max - az_min) > A_SteadyThreshold))
    {
            SET_WARMUP_FLAG;
            QueDelay (ClearWarmup, 1000);
            sprintf (Buf, "Noise Z%c", 0x1c);
            if (ProgramMode)
                    lcd_print (LEFT, 5, 1, Buf, 0, 0);
    }
    else
    if ((x_max - x_min) > X_SteadyThreshold)
    {
            SET_WARMUP_FLAG;
            QueDelay (ClearWarmup, 1000);
            sprintf (Buf, "Noise X max:%x min:%x", x_max, x_min);
            if (ProgramMode)
                    lcd_print (LEFT, 5, 1, Buf, 0, 0);
    }
    else
    if ((y_max - y_min) > X_SteadyThreshold)
    {
```

```
SET_WARMUP_FLAG;
QueDelay (ClearWarmup, 1000);
sprintf (Buf, "Noise Y max:%x min:%x", y_max, y_min);
if (ProgramMode)
        lcd_print (LEFT, 5, 1, Buf, 0, 0);
}
else
{
    num_steady_samples--;
    if (num_steady_samples == 0)
    {
        if (x_steady < 0)
                x_steady -= STEADY_SAMPLES / 2;
        else
                x_steady += STEADY_SAMPLES / 2;
        if (y_steady < 0)
                y_steady -= STEADY_SAMPLES / 2;
        else
                y_steady += STEADY_SAMPLES / 2;
        x_offset = x_steady / STEADY_SAMPLES;
        y_offset = y_steady / STEADY_SAMPLES;
        x_sum += STEADY_SAMPLES / 2;
        y_sum += STEADY_SAMPLES / 2;
        z_sum += STEADY_SAMPLES / 2;
        x_sum /= STEADY_SAMPLES;
        y_sum /= STEADY_SAMPLES;
        z_sum /= STEADY_SAMPLES;
        dax = x_sum / Gain_AX;
        day = y_sum / Gain_AX;
        daz = z_sum / Gain_AX;
        grv_axyz_mag_ref = Root((dax*dax) + (day*day) + (daz*daz));
        sign = (int)(grv_axyz_mag_ref * 10);
        sprintf (Buf, "X=%x Y=%x GV=%d", x_offset, y_offset, sign);
        if (ProgramMode)
                lcd_print (LEFT, 6, 1, Buf, 0, 0);
        LED_PORT &= ~GRN_LED;
        Write_NVRAM();
        LED_PORT |= GRN_LED;
```

```
                CLR_STEADY_FLAG;
                Gyro_Off();
            }
        }
    }

//----------------------------------------------------------------
// gyro_get_report
//----------------------------------------------------------------
unsigned char gyro_get_report (GYRO_REPORT *report)
{
    if (WARMUP_FLAG_TRUE)
    {
            CLR_DATA_FLAG;
            return (0);
    }
    if (DATA_FLAG_TRUE)
    {
            report->x = Xdata;
            report->y = Ydata;
            if (Xdata || Ydata)
                    return (1);
            return (0);
    }
    return (2);
} void DoCalcs (void)
{
    if (STEADY_FLAG_TRUE)
    {
            CLR_RAW_FLAG;
            if (WARMUP_FLAG_TRUE)
                    Reset_Self_Steady();
            else
                    Self_Steady();
            return;
    }
```

```
P3OUT |= 0x20;
switch (CalcState)
{
    case 0:
    CLR_RAW_FLAG;
    SET_CALC_FLAG;
    dax = -accel_x/Gain_AX;
    day = -accel_y/Gain_AX;
    daz = accel_z/Gain_AX;
    CalcState++;
    break;

case 1:
    // Our roll compensation dead zone.
    gvisya = ( (gvisya*19) + (Dabs(day)/Root(dax*dax+daz*daz)) )*0.05;
    CalcState++;
    break;

case 2:
    if( gvisya <= GVECTOR_ZERO )
    // V^2 magnitude cutoff. GUL limits roll compensation by additive velocity in one
        // direction of mag(AX,AY,AZ) relitive to G-vector, while GLL limits roll
        // compensation by subtractive velocity of the total accelermeter magnitude.
        grv_axyz_mag = Root((dax*dax) + (day*day) + (daz*daz));
    CalcState++;
    break;

case 3:
    //theta1 = ((Dabs(theta1 * 1) + Dabs(theta3)) / 2);/////////////////////
    //if (theta3 < 0)////////////////
    //   theta1 = -Dabs(theta3);/////////////////////// if( (grv_axyz_mag <= (grv_axyz_mag_ref)+0.75) && (grv_axyz_mag >= (grv_axyz_mag_ref-0.75)) )
            theta2 = Get_Theta(dax, daz);//
    CalcState++;
    break;
```

```
case 4:
// Non-Linear Delta Decimation:Uber Good
/*
if((theta1 - theta2) >= 0)
        theta2 = ( (Root(Dabs(theta1 - theta2)) + (theta2)) );
else
        theta2 = ( (theta2) - (Root(Dabs(theta1 - theta2))) );
*/
//theta2 = theta1;///////////////// no non linear filter
// Add Simple Backward Weighted Averaging: OK, Done at last.

theta3 = ((Dabs(theta3 * 9) + Dabs(theta2)) *0.1);
if (theta2 < 0)
   theta3 = -Dabs(theta2);

///////////////theta3 = -PI/2;///////////// for debuging Epsons.
//theta3 = theta2;///////// for debuging theta 2,3 Filters
CalcState++;
break;

case 5:
// Change Yaw and Pitch into magnitude and angle.
Calc_Mickeys();
rrx = x_mickeys;
rry = y_mickeys;
rr_mag = Root(rrx*rrx + rry*rry);
CalcState++;
break;

case 6:
theta4 = Get_Theta(x_mickeys, y_mickeys);
CalcState++;
//if((rr_mag) > (double)(Gain_X))///////////////////// theta3 restore from theta1 filter cutoff
//{
   //theta3 = theta1;///////////////////////////////
//}
``` break;

case 7:
// Roll compensate Yaw and Pitch calculations.
rrx = rr_mag * Swine(theta4 + PI - theta3);
CalcState++;
break;

case 8:
rry = rr_mag * Swine(theta4 + PIBY2 - theta3 );
x_mickeys = (signed int)(rrx + extra_yaw);
y_mickeys = (signed int)(rry + extra_pitch);
CalcState++;
break;

case 9:
// Residual from gain division.
extra_yaw = ((x_mickeys) % Gain_X);
extra_pitch = ((y_mickeys) % Gain_Y);
// Stop accumulating residual offset.
extra_yaw = (double)((int)(extra_yaw * 0.1) * 10);
extra_pitch = (double)((int)(extra_pitch * 0.1) * 10);

if (SENT_FLAG_TRUE || WARMUP_FLAG_TRUE)
{
    CLR_SENT_FLAG;
    CLR_UPDATE_FLAG;
    Xdata = 0;
    Ydata = 0;
}
else
    SET_UPDATE_FLAG;
if (jerk_timer)
{
    Xdata = 0;
    Ydata = 0;
}
else

```
        {
            Xdata += (signed char)(x_mickeys / Gain_X);
            Ydata += (signed char)(-y_mickeys / Gain_Y);
        }
        CalcState = 0;
        CLR_CALC_FLAG;
        SET_DATA_FLAG;
        break;

default:
        Trap (2);
    }
    P3OUT &= ~0x20;
}

//----------------------------------------------------------------
// Dabs
//----------------------------------------------------------------
double Dabs(double x)
{
    if(x < 0)
        x = -x;
    return x;
}

//----------------------------------------------------------------
// Swine
//----------------------------------------------------------------
double Swine(double x)
{
    double even, y;

even = (int)(x/(PI));
    x = x - (PI*even);
    if((int)(even/2) != (even/2))
    {
        x = -x;
    }
```

```
    y = COEFF_3 * x + COEFF_4 * x * Dabs(x);
    //y = COEFF_5 * (y * Dabs(y) - y) + y;
      return y;
}

//------------------------------------------------------------
// Get_Theta
//------------------------------------------------------------
double Get_Theta(double x, double y)
{
   double abs_y, r, angle;

abs_y = Dabs(y) + 0.0000000001F;     // Prevent /0 condition if (x >= 0)
   {
      r = (x - abs_y) / (x + abs_y);
      angle = COEFF_1 - COEFF_1 * r;
   }
     else
   {
      r = (x + abs_y) / (abs_y - x);
      angle = COEFF_2 - COEFF_1 * r;
   }
   if (y < 0)
   return(-angle);     // negate if in quad III or IV
   else
   return(angle);
}

//------------------------------------------------------------
// Root
//------------------------------------------------------------
double Root(double number)
{
    long i;
    float x, y, z;
    const float f = 1.5F;
```

While the invention may be susceptible to various modifications and alternative forms, specific embodiments have been shown by way of example in the drawings and are described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for providing roll compensation in a control device, the method comprising:
    generating a signal from at least one sensor element, the signal including rotational data and linear data, the signal generated as a result of movement of the control device;
    applying, by a processor, a roll compensation to the rotational data in the signal, the roll compensation being applied without translating a frame of reference for the control device;
    processing, by a processor, the linear data in the signal to determine a roll compensation error, the roll compensation error being an undesirable effect of applying the roll compensation;
    removing, by a processor, the roll compensation error from the roll compensated rotational data, the roll compensation error computed without calculating centrifugal acceleration and linear acceleration; and
    producing an output signal indicative of motion of the control device based on the generated signal and the roll compensated data with the roll compensation error removed, the output signal used for control of graphics on a display by the control device.

2. The method of claim 1, wherein acquiring rotational data includes receiving rotational data from a gyroscope sensor.

3. The method of claim 1, wherein acquiring linear data includes receiving linear data from an accelerometer.

4. The method of claim 1, wherein the output signal is further used to control a movement of a graphical element.

5. The method of claim 4, wherein the graphical element is one of a cursor, a highlight box, a menu, a game character and a graphical object.

6. The method of claim 1, wherein the output signal is further used to control a movement of a movable device after the roll compensation error is removed from the roll compensated data.

7. The method of claim 6, wherein the movable device is one of a remote controlled car, remote controlled plane, remote controlled boat and remote controlled electro-mechanical device.

8. The method of claim 1, wherein the control device is one of a remote control, a mouse, a game controller, a virtual reality controller, a pointer, a mobile device and a digital media input devices.

9. The method of claim 1, wherein the control device is integrated into a hand-held platform.

10. The method of claim 9, wherein the hand-held platform is one of a game console, a personal digital assistant, a cell phone, a wireless phone and a mobile television.

11. The method of claim 1, wherein the control of graphics further includes at least one of a movement of graphic elements on a display and a selection of graphic elements on the display.

12. A control device comprising:
    means for generating a signal based on movement of the control device, the signal including rotational data and linear data;
    means for applying a roll compensation to the rotational data in the signal, the roll compensation being applied without translating a frame of reference for the control device;
    means for processing the linear data in the signal to determine a roll compensation error, the roll compensation error being an undesirable effect of applying the roll compensation;
    means for removing the roll compensation error from the roll compensated rotational data, the roll compensation error computed without calculating centrifugal acceleration and linear acceleration; and
    means for producing an output signal indicative of motion of the control device based on the generated signal and the roll compensated data with the roll compensation error removed, the output signal used for control of graphics on a display by the control device.

13. The control device of claim 12, wherein the means for acquiring rotational data is a gyroscope sensor.

14. The control device of claim 12, wherein the means for acquiring linear data includes an accelerometer.

15. The control device of claim 12, the output signal is further used to control a movement of a graphical element.

16. The control device of claim 15, wherein the graphical element is one of a cursor, a highlight box, a menu, a game character and a graphical object.

17. The control device of claim 12, wherein the output signal is further used control a movement of a movable device.

18. The control device of claim 17, wherein the movable device is one of a remote controlled car, remote controlled plane, remote controlled boat and remote controlled electro-mechanical device.

19. The control device of claim 12, wherein the control device is one of a remote control, a mouse, a game controller, a virtual reality controller, a pointer, a mobile device and a digital media input devices.

20. The control device of claim 12, wherein the control device is integrated into a hand-held platform.

21. The control device of claim 20, wherein the hand-held platform is one of a game console, a personal digital assistant, a cell phone, a wireless phone and a mobile television.

22. The control device of claim 12, wherein the output signal is further used control at least one of a movement of graphic elements on a display and a selection of graphic elements on the display.

23. An apparatus comprising:
    a first sensor that generates a first signal as a result of a movement of the apparatus, the first signal including rotational data;
    a second sensor that generates a second signal as a result of the movement of the apparatus, the second signal including linear data; and
    a controller that receives the first signal and the second signal, the controller applying a roll compensation to the rotational data in the first signal, the roll compensation being applied without translating a frame of reference for the apparatus and processing the linear data in the second signal to determine a roll compensation error, the roll compensation error being an undesirable effect of applying the roll compensation, the controller further removing the roll compensation error from the roll compensated rotational data to produce an output signal indicative of motion of the apparatus, the output signal used to control graphics on a display, wherein the roll compensation error is computed without calculating centrifugal acceleration and linear acceleration.

24. The apparatus of claim 23, wherein the first sensor is a gyroscope sensor.

25. The apparatus of claim 23, wherein the second sensor includes an accelerometer.

26. The apparatus of claim 23, the output signal is further used to control a movement of a graphical element.

27. The apparatus of claim 26, wherein the graphical element is one of a cursor, a highlight box, a menu, a game character and a graphical object.

28. The apparatus of claim 23, wherein the output signal is further used control a movement of a movable device.

29. The apparatus of claim 28, wherein the movable device is one of a remote controlled car, remote controlled plane, remote controlled boat and remote controlled electro-mechanical device.

30. The apparatus of claim 23, wherein the apparatus is one of a remote control, a mouse, a game controller, a virtual reality controller, a pointer, a mobile device and a digital media input devices.

31. The apparatus of claim 23, wherein the apparatus is integrated into a hand-held platform.

32. The apparatus of claim 31, wherein the hand-held platform is one of a game console, a personal digital assistant, a cell phone, a wireless phone and a mobile television.

33. The apparatus of claim 23, wherein the output signal is further used to control at least one of a movement of graphic elements on a display and a selection of graphic elements on the display.

34. An apparatus comprising:
a first sensor that generates a first signal as a result of a movement of the apparatus, the first signal including rotational data;
a second sensor that generates a second signal as a result of the movement of the apparatus, the second signal including linear data; and
a controller that receives the first signal and the second signal, the controller applying a roll compensation to the rotational data in the first signal, the roll compensation being applied without translating a frame of reference for the apparatus and processing the linear data in the second signal to determine a roll compensation error, the roll compensation error being an undesirable effect of applying the roll compensation, the controller further removing the roll compensation error from the roll compensated data to produce an output signal indicative of motion of the apparatus, the output signal used to control a movement of a movable device,
wherein the roll compensation error is computed without calculating centrifugal acceleration and linear acceleration.

35. The apparatus of claim 34, wherein the first sensor is a gyroscope sensor.

36. The apparatus of claim 34, wherein the second sensor includes an accelerometer.

37. The apparatus of claim 34, wherein the output signal is further used to control a movement of a graphical element.

38. The apparatus of claim 37, wherein the graphical element is one of a cursor, a highlight box, a menu, a game character and a graphical object.

39. The apparatus of claim 34, wherein the movable device is one of a remote controlled car, remote controlled plane, remote controlled boat and remote controlled electro-mechanical device.

40. The apparatus of claim 34, wherein the apparatus is one of a remote control, a mouse, a game controller, a virtual reality controller, a pointer, a mobile device and a digital media input devices.

41. The apparatus of claim 34, wherein the apparatus is integrated into a hand-held platform.

42. The apparatus of claim 41, wherein the hand-held platform is one of a game console, a personal digital assistant, a cell phone, a wireless phone and a mobile television.

43. The apparatus of claim 34, wherein the output signal is further used to control at least one of a movement of graphic elements on a display and a selection of graphic elements on the display.

44. A method comprising:
generating a signal from at least one sensor element, the signal including rotational data and linear data, the signal generated as a result of movement of the control device;
applying, by a processor, a roll compensation to the rotational data in the signal, the roll compensation being applied without translating a frame of reference for the control device;
processing, by a processor, the linear data in the signal to determine a roll compensation error, the roll compensation error being an undesirable effect of applying the roll compensation; removing, by a processor, the roll compensation error from the roll compensated rotational data, the roll compensation error computed without calculating centrifugal acceleration and linear acceleration; and
producing an output signal indicative of motion of the control device based on the generated signal and the roll compensated data with the roll compensation error removed, the output signal used to control a movement of a movable device.

45. The method of claim 44, wherein acquiring rotational data includes receiving rotational data from a gyroscope sensor.

46. The method of claim 44, wherein acquiring linear data includes receiving linear data from an accelerometer.

47. The method of claim 44, wherein the output signal is further used to control a movement of a graphical element.

48. The method of claim 47, wherein the graphical element is one of a cursor, a highlight box, a menu, a game character and a graphical object.

49. The method of claim 44, wherein the movable device is one of a remote controlled car, remote controlled plane, remote controlled boat and remote controlled electro-mechanical device.

50. The method of claim 44, wherein the control device is one of a remote control, a mouse, a game controller, a virtual reality controller, a pointer, a mobile device and a digital media input devices.

51. The method of claim 44, wherein the control device is integrated into a hand-held platform.

52. The method of claim 51, wherein the hand-held platform is one of a game console, a personal digital assistant, a cell phone, a wireless phone and a mobile television.

53. The method of claim 44, wherein the output signal is further used to control at least one of a movement of graphic elements on a display and a selection of graphic elements on the display.

* * * * *